(12) United States Patent
Li

(10) Patent No.: US 11,068,586 B2
(45) Date of Patent: Jul. 20, 2021

(54) VIRTUAL HOST ISOLATION

(71) Applicant: Alibaba Group Holding Limited, Grand Cayman (KY)

(72) Inventor: Nan Li, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 233 days.

(21) Appl. No.: 15/146,002

(22) Filed: May 4, 2016

(65) Prior Publication Data
US 2016/0330073 A1 Nov. 10, 2016

(30) Foreign Application Priority Data
May 6, 2015 (CN) .......................... 201510226829.8

(51) Int. Cl.
| | | |
|---|---|---|
| *H04L 12/24* | (2006.01) | |
| *G06F 9/48* | (2006.01) | |
| *G06F 21/53* | (2013.01) | |
| *H04L 29/08* | (2006.01) | |
| *G06F 21/44* | (2013.01) | |
| *G06F 9/455* | (2018.01) | |
| *G06F 16/958* | (2019.01) | |
| *G06F 9/50* | (2006.01) | |

(52) U.S. Cl.
CPC .......... *G06F 21/53* (2013.01); *G06F 9/45504* (2013.01); *G06F 9/5011* (2013.01); *G06F 16/958* (2019.01); *G06F 21/44* (2013.01); *H04L 67/02* (2013.01); *H04L 67/32* (2013.01)

(58) Field of Classification Search
CPC ..... H04L 41/0803; H04L 67/02; H04L 67/32; G06F 9/4843; G06F 21/53
USPC .......................................................... 709/223
See application file for complete search history.

(56) References Cited

U.S. PATENT DOCUMENTS

| | | | |
|---|---|---|---|
| 6,044,439 A | 3/2000 | Ballard | |
| 6,976,258 B1 | 12/2005 | Goyal | |
| 7,062,642 B1 | 6/2006 | Langrind | |
| 7,457,870 B1 | 11/2008 | Lownsbrough | |
| 7,617,314 B1 | 11/2009 | Bansod | |
| 7,639,613 B1 | 12/2009 | Ghannadian | |
| 9,256,467 B1 | 2/2016 | Singh | |

(Continued)

FOREIGN PATENT DOCUMENTS

| | | |
|---|---|---|
| CN | 101272530 | 9/2008 |
| CN | 103118327 | 5/2013 |

(Continued)

*Primary Examiner* — James E Springer
*Assistant Examiner* — Patrick F Ngankam
(74) *Attorney, Agent, or Firm* — Shun Yao; Park, Vaughan, Fleming & Dowler LLP.

(57) ABSTRACT

One embodiment of the present invention provides a system for isolating virtual hosts on a network server device. During operation, the system creates a container for a virtual host of a plurality of virtual hosts of a web server running on the network server device. A respective virtual host of the plurality of virtual hosts represents a website running on the web server. If the system receives a web request for a dynamic resource from a client, the system identifies the virtual host as associated with the web request. The system then runs a script interpreter process for generating the dynamic resource in the container and sends a response message comprising the dynamic resource to the client.

20 Claims, 12 Drawing Sheets

(56) References Cited

U.S. PATENT DOCUMENTS

| | | |
|---|---|---|
| 9,612,758 B1 | 4/2017 | Liu |
| 9,936,333 B2 | 4/2018 | Lau |
| 2002/0161990 A1 | 10/2002 | Zhang |
| 2003/0135612 A1 | 7/2003 | Huntington |
| 2004/0078520 A1 | 4/2004 | Don |
| 2005/0052992 A1 | 3/2005 | Cloonan |
| 2005/0257222 A1 | 11/2005 | Davis |
| 2005/0268075 A1 | 12/2005 | Caprioli |
| 2006/0028999 A1 | 2/2006 | Iakobashvili |
| 2006/0143617 A1 | 6/2006 | Knauerhase |
| 2006/0190236 A1 | 8/2006 | Malloy |
| 2006/0288015 A1 | 12/2006 | Schirripa |
| 2007/0041331 A1 | 2/2007 | Ma |
| 2007/0276990 A1 | 11/2007 | Mosek |
| 2007/0283009 A1 | 12/2007 | Takemura |
| 2008/0216086 A1 | 9/2008 | Tanaka |
| 2008/0288661 A1 | 11/2008 | Galles |
| 2009/0144731 A1 | 6/2009 | Brown |
| 2009/0300210 A1 | 12/2009 | Ferris |
| 2009/0300578 A1 | 12/2009 | Neil |
| 2009/0307396 A1 | 12/2009 | Nogueras |
| 2011/0106802 A1 | 5/2011 | Pinkney |
| 2011/0173251 A1* | 7/2011 | Sandhu ............ G06F 8/61 709/203 |
| 2011/0191477 A1 | 8/2011 | Zhang |
| 2011/0265164 A1* | 10/2011 | Lucovsky ............ G06F 9/5055 718/1 |
| 2011/0276951 A1 | 11/2011 | Jain |
| 2011/0296488 A1 | 12/2011 | Dandekar |
| 2012/0084262 A1 | 4/2012 | Dwarampudi |
| 2012/0221611 A1 | 8/2012 | Watanabe |
| 2012/0239825 A1 | 9/2012 | Xia |
| 2012/0239896 A1 | 9/2012 | Sobel |
| 2012/0324572 A1 | 12/2012 | Gordon |
| 2013/0055241 A1 | 2/2013 | De |
| 2013/0086340 A1 | 4/2013 | Fleming |
| 2013/0157622 A1 | 6/2013 | Thaper |
| 2013/0246619 A1 | 9/2013 | Raja |
| 2013/0283273 A1 | 10/2013 | Miyazaki |
| 2014/0019689 A1 | 1/2014 | Cain, III |
| 2014/0053150 A1* | 2/2014 | Barnett ............ G06F 9/45558 718/1 |
| 2014/0066101 A1 | 3/2014 | Lyman |
| 2014/0130038 A1 | 5/2014 | Lucovsky |
| 2014/0177497 A1 | 6/2014 | Backholm |
| 2014/0223427 A1 | 8/2014 | Bootland |
| 2015/0033324 A1* | 1/2015 | Fainkichen ............ C09J 7/30 726/15 |
| 2015/0089584 A1 | 3/2015 | Lim |
| 2015/0120914 A1 | 4/2015 | Wada |
| 2015/0120928 A1* | 4/2015 | Gummaraju ........ H04L 67/1008 709/226 |
| 2015/0150003 A1* | 5/2015 | Emelyanov ............ G06F 9/455 718/1 |
| 2015/0169341 A1 | 6/2015 | Gulati |
| 2015/0181617 A1 | 6/2015 | Luna |
| 2015/0212919 A1 | 7/2015 | Srour |
| 2015/0215816 A1 | 7/2015 | Abou-Elkheir |
| 2015/0248284 A1 | 9/2015 | Poiesz |
| 2015/0347262 A1 | 12/2015 | Vyas |
| 2016/0021211 A1 | 1/2016 | Yellin |
| 2016/0077857 A1 | 3/2016 | Dong |
| 2016/0080229 A1 | 3/2016 | Kobayashi |
| 2016/0162320 A1* | 6/2016 | Singh ............ G06F 9/45558 718/1 |

FOREIGN PATENT DOCUMENTS

| | | |
|---|---|---|
| CN | 103186337 | 7/2013 |
| CN | 103369508 | 10/2013 |
| CN | 103440113 | 12/2013 |
| CN | 103870341 | 6/2014 |
| CN | 104111800 | 10/2014 |
| WO | 2013079113 | 6/2013 |

* cited by examiner

VIRTUAL HOST ISOLATION

RELATED APPLICATION

Under 35 U.S.C. § 119, this application claims the benefit and right of priority of Chinese Patent Application No. 201510226829.8, filed 6 May 2015.

BACKGROUND

Field

The present invention relates to the technical field of virtual hosting and, in particular, relates to a method and system for isolating virtual hosts from each other on a network server.

Related Art

To fully utilize resources of a network server, such as processing capability and storage, the network server can provide services to a plurality of resource users simultaneously. Under such circumstances, a network server operating as a web server can be divided into a plurality of "virtual hosts," each of which is associated with a domain name on the same network server. A respective virtual host running on the network server can have its independent system resources, such as IP address, disk space, memory, and processing capability (e.g., central processing unit (CPU) use time). As a result, each individual virtual host can facilitate web server functionality to the users; hence, each virtual host running on the network server can operate as an independent server.

Even though a plurality of virtual hosts can run on the same network server, the border between the virtual hosts may not be defined. As a result, a number of network services, such as firewall and intrusion detection, may not exist among the virtual hosts. This can lead to interferences and security problems among the virtual hosts. For example, if a virtual host becomes compromised (e.g., by a hacker), security of other virtual hosts on the same host machine can also become compromised from that virtual host. To facilitate independence among the virtual hosts on the same network server, the virtual hosts should be isolated.

Typically, a virtual host manager, such as a hypervisor, may not provide such isolation among the virtual hosts. As a result, isolation among the virtual hosts often relies upon the expertise of a network administrator. However, configuring individual virtual hosts for isolation can be tedious and error-prone. In addition, some isolation configuration is for specific scripting language. A compromised virtual host can bypass isolation restriction merely by using a different language. In this way, the proper isolation is may not be present among the virtual hosts and thus, security risks remain present.

SUMMARY

One embodiment of the present invention provides a system for isolating virtual hosts on a network server device. During operation, the system creates a container for a virtual host of a plurality of virtual hosts of a web server running on the network server device. A respective virtual host of the plurality of virtual hosts represents a website running on the web server. If the system receives a web request for a dynamic resource from a client, the system identifies the virtual host as associated with the web request. The system then runs a script interpreter process for generating the dynamic resource in the container and sends a response message comprising the dynamic resource to the client.

In a variation of this embodiment, the system creates the container by creating a directory tree for the virtual host and setting a home directory of the directory tree as a root directory for the virtual host. The directory tree includes one or more common resource utilization directories.

In a variation of this embodiment, the system establishes a process identifier (PID) namespace for the virtual host, wherein a respective process identifier of the virtual host is generated from the PID namespace.

In a further variation, the system maintains a mapping between an identifier of the virtual host and the PID namespace.

In a variation of this embodiment, the system creates a container process manager (CPM) for the virtual host. The CPM is configured to: (i) run in the container of the virtual host, (ii) manage processes of the virtual host, and (iii) operate as a parent process for the processes of the virtual host.

In a further variation, the system spawns the script interpreter process from the CPM and provides the dynamic resource to the web server.

In a further variation, if the system detects a CPM failure for a second web request, the system sends an error message to the client.

In a variation of this embodiment, the system registers the container with the web server.

BRIEF DESCRIPTION OF THE DRAWINGS

The accompanying drawings herein, which are incorporated herein and constitute a part of the specification, illustrate several exemplary embodiments of the present application and, together with the description, serve to illustrate the present application, construing no limitation to the present application. In the drawings.

In the figures, like reference numerals refer to the same figure elements.

DETAILED DESCRIPTION OF EMBODIMENTS

Figure 1A:
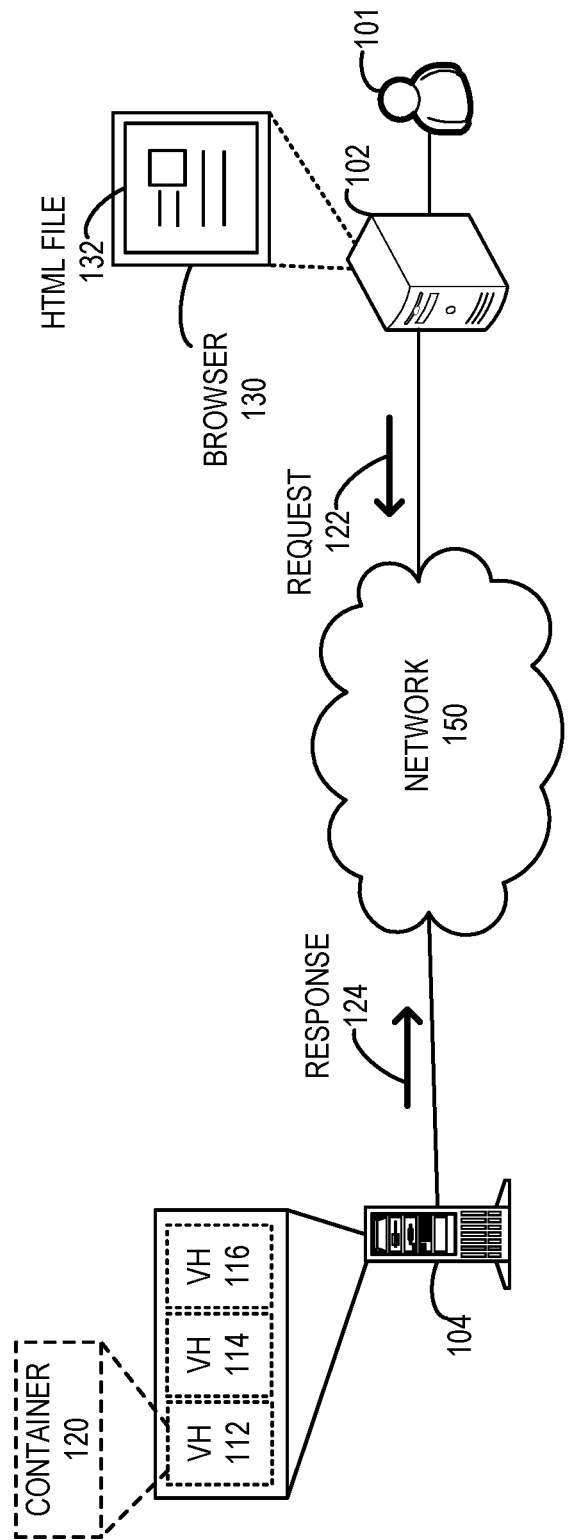
FIG. 1A illustrates an exemplary system comprising a network server facilitating isolation among virtual hosts, in accordance with an embodiment of the present application.

Embodiments of the present invention solve the problem of facilitating isolation among the virtual hosts running on the same network server by creating a dedicated container for a respective virtual host. Upon receiving a web request (e.g., a Hypertext Transfer Protocol (HTTP) request), a virtual host operates within a container to respond to the request, thereby ensuring isolation from other virtual hosts.

Suppose that the network server runs a web server, which includes a plurality of virtual hosts. Virtual hosts facilitate running multiple websites (e.g., with different domain names) on a single server machine (e.g., a network server). Virtual hosts can be based on the Internet Protocol (IP) addresses such that a different IP address is allocated for each website (i.e., for each virtual host). Virtual hosts can also be based on domain names such that multiple domain names can be represented by a same IP address. A client may not determine that multiple websites are running on the same network server.

With existing technologies, to facilitate isolation among virtual hosts, a network administrator restricts the access rights of the virtual hosts via dedicated configurations. A virtual host can access resources only within a predetermined configuration range. However, the access rights are usually configured at the implementation level (e.g., the configuration of a scripting language, such as PHP). As a result, the isolation among the virtual hosts remains at the language level. The access rights at the language level can be circumvented by using another scripting language. As a result, such language-level isolation may not provide shielding from a malicious virtual host. Furthermore, some scripting languages may not support access rights for virtual hosts; hence, for these scripting languages, the network administrator may not be able to define access rights.

To solve this problem, embodiments of the present invention provide a container to a virtual host, which runs its web server within the restriction provided by the container. The network server hosting the virtual host creates a directory tree for that virtual host. The root directory of the directory tree operates as the root directory for the file system of the virtual host. As a result, files accessed by the virtual host can be confined within the directory tree. In this way, the directory tree for the virtual host operates as the container for the virtual host, thereby ensuring isolation of file access from the virtual host.

Furthermore, the network server can also have a dedicated and unique process identifier (PID) namespace for the virtual host. As a result, all the processes spawned for the virtual host can be in the PID namespace, and are thereby isolated from the processes of other virtual hosts. In addition, the network server can have a container process manager (CPM), which runs within the restriction of the container and operates as the parent process for all processes spawned for the virtual host. When a new web request arrives, a script interpreter process (e.g., a PHP script interpreter process) can spawn from the CPM. Since the file access of a child process is restricted by the parent process, the new process spawned from the CPM is restricted within the container as well.

FIG. 1A illustrates an exemplary system comprising a network server facilitating isolation among virtual hosts, in accordance with an embodiment of the present application. During operation, if a user 101 wishes to visit a web page on browser 130 of a client device 102, device 102 can issue a web request 122 (e.g., an HTTP request) to a network server 104. Device 102 and server 104 are coupled to each other via network 150, which can be a local or wide area network. Network server 104 can operate as a host machine for a plurality of virtual hosts 112, 114, and 116. Suppose that virtual host 112 on network server 104 runs a web server corresponding to web request 122.

With existing technologies, to facilitate the isolation among virtual hosts 112, 114, and 116, a network administrator restricts the access rights of the virtual hosts on network server 104. Usually, the network administrator provides dedicated configurations for isolating a virtual host. For example, virtual host 112 can access resources only within a predetermined configuration range specified by the network administrator. However, these access rights are usually configured at the implementation level (e.g., the configuration of a scripting language, such as PHP). As a result, the isolation among virtual hosts 112, 114, and 116 remains at the language level. If virtual host 112 becomes compromised, virtual host 112 can circumvent its access rights by using another scripting language, such as Python and Perl, etc. As a result, such language-level isolation may not provide shielding to virtual hosts 114 and 116 from a compromised virtual host 112.

To solve this problem, embodiments of the present invention provide a container 120 to virtual host 112. Virtual host 112 runs the web server within the restriction provided by container 120. In some embodiments, network server 104 creates a directory tree for virtual host 112. The root directory of the directory tree operates as the root directory for the file system of virtual host 112. As a result, files accessed by virtual host 112 can be confined within the directory tree. In this way, the directory tree for virtual host 112 operates as container 120 for virtual host 112, thereby ensuring isolation of file access from virtual host 112.

Furthermore, network server 104 can also have a dedicated and unique PID namespace for virtual host 112. As a result, all the processes spawned for the web server running on virtual host 112 can be in the PID namespace. Processes in the same PID namespace can be retrieved based on the PID. As a result, the processes associated with the web server in virtual host 112 remain isolated from the processes of virtual hosts 114 and 116. In addition, network server 104 can have a CPM, which is a dedicated process for virtual host 112 to manage all processes of the web server. Hence, the CPM runs within the restriction of container 120 and operates as the parent process for all processes spawned for virtual host 112. When network server 104 receives web request 122 from network 150, network server 104 determines that web request 122 is for virtual host 112 and provides web request 122 to virtual host 112.

If web request 122 is for a dynamic resource (e.g., resource obtained based on running a script), the web server running on virtual host 112 can spawn a script interpreter process from the CPM of virtual host 112. Since the file access of a child process is restricted by the parent process, the new process spawned from the CPM is restricted within container 120 as well. This isolated script interpreter process parses the script and provides the content output (e.g., the dynamic resource) to the web server. The web server then generates a web response 124 (e.g., an HTTP response) comprising the content output and sends web response 124 to device 102 via network 150.

Figure 1B:
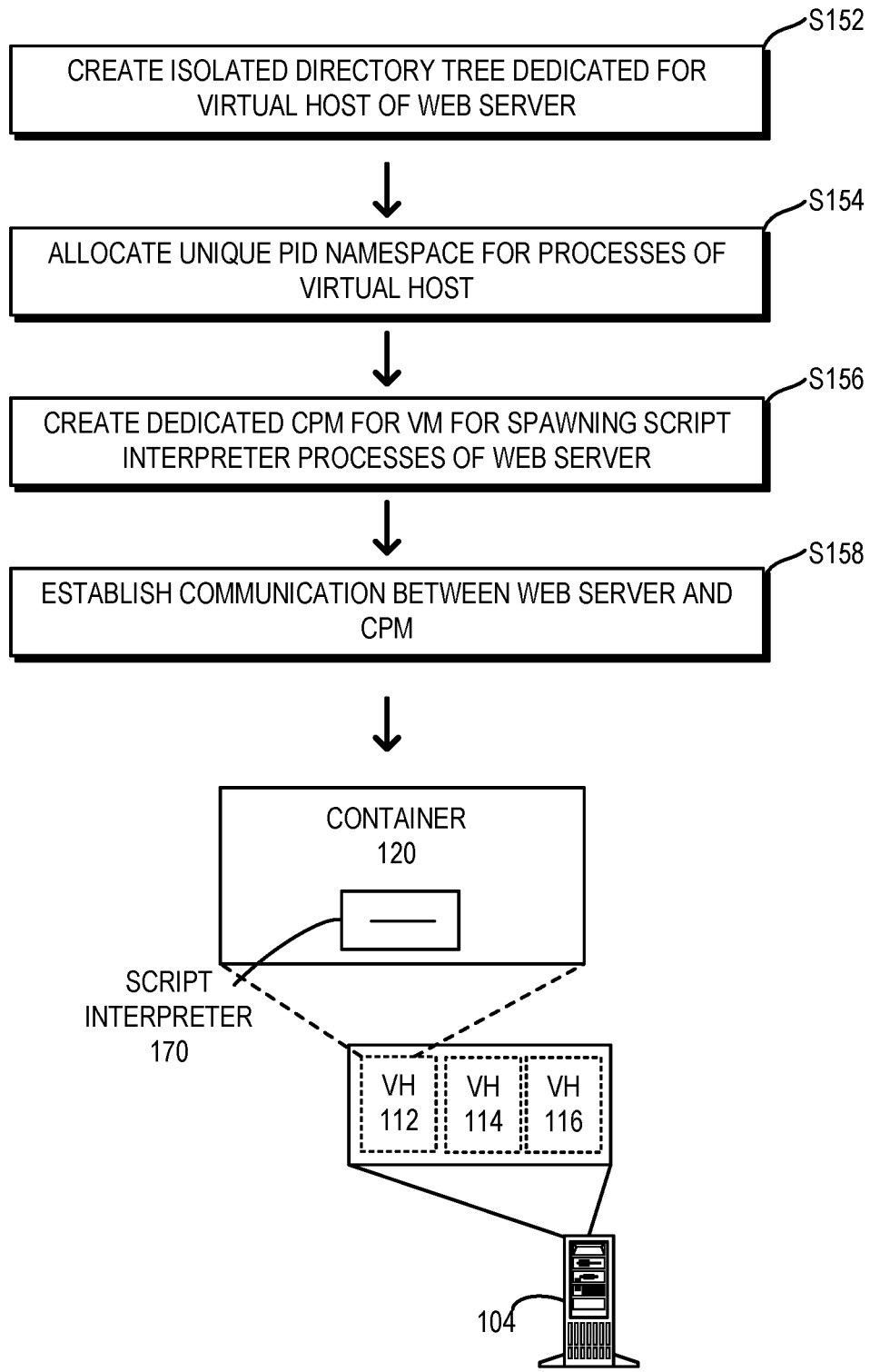
FIG. 1B illustrates an exemplary process of a network server facilitating isolation of a web server running in a container for a virtual host, in accordance with an embodiment of the present application.

FIG. 1B illustrates an exemplary process of a network server facilitating isolation of a web server running in a container for a virtual host, in accordance with an embodiment of the present application. During operation, network server 104 creates an isolated directory tree dedicated for a virtual host of a web server (operation S152). Network server 104 then allocates a unique PID for the processes of the virtual host (operation S154). Network server 104 creates a dedicated CPM for the virtual host for spawning script interpreter processes of the web server (operation S156). Network server 104 then establishes communication between the web server and the CPM (operation S158). In this way, network server 104 can spawn a script interpreter process 170 within the confinement of container 120 of virtual host 120.

In the example in FIG. 1A, network server 104 can have its own directory structure system. In the directory structure system, the uppermost directory is the root directory of network server 104. One or more subdirectories associated with different requirements of network server 104 (and its operating system) are present under the root directory. A number of lower-level subdirectories in a hierarchy can be present under a subdirectory of the root directory. In this way, directories in various hierarchies and various levels can form a tree-like file system. Therefore, the directory structure system of network server 104 can also be referred to as a directory tree.

Figure 2A:
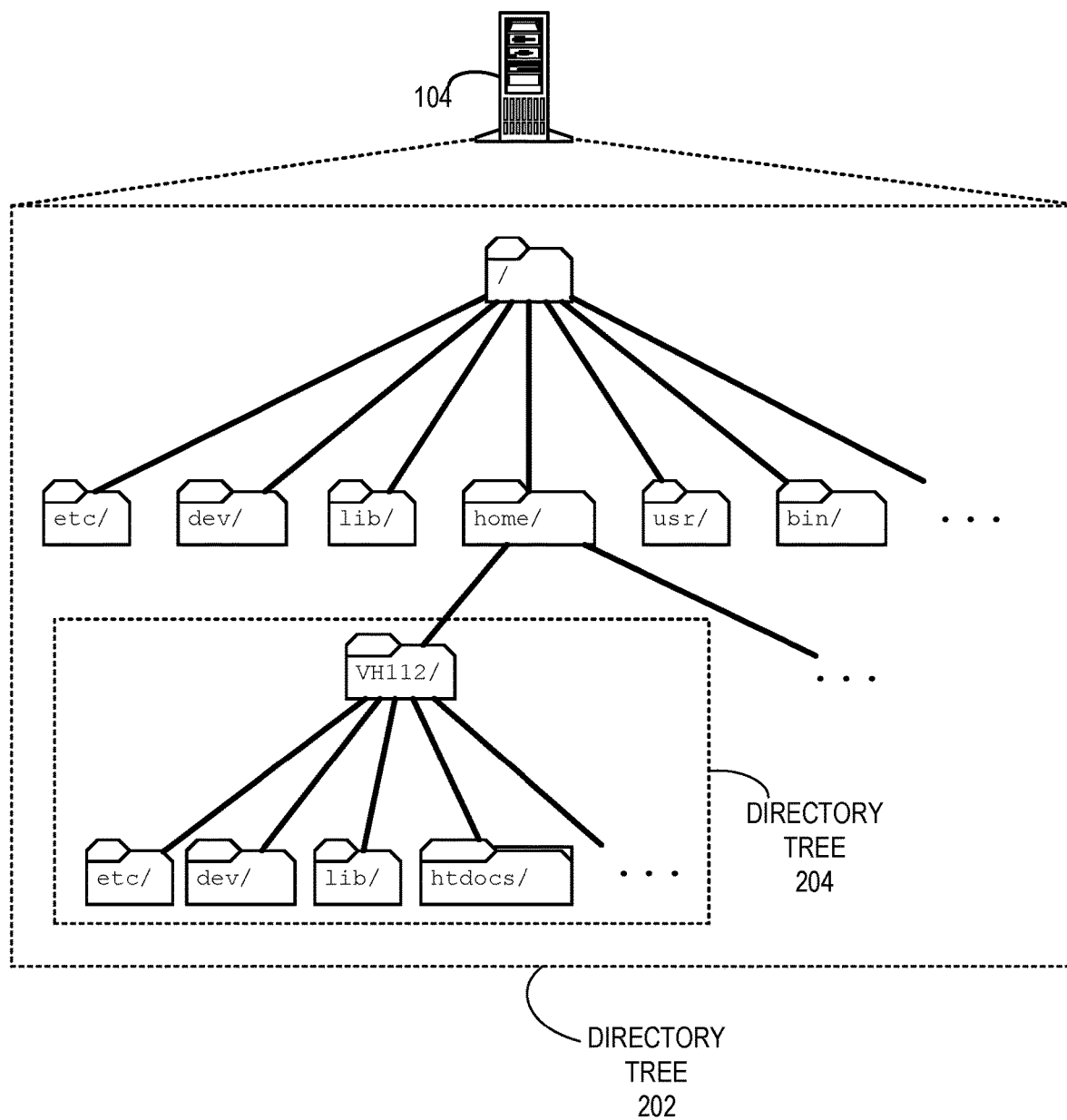
FIG. 2A illustrates an exemplary directory tree for facilitating isolation of a virtual host, in accordance with an embodiment of the present application.

FIG. 2A illustrates an exemplary directory tree for facilitating isolation of a virtual host, in accordance with an embodiment of the present application. In this example, the operating system of network server 104 is the Linux operating system. Directory tree 202 represents the directory structure of the operating system of network server 104. In directory tree 202, "/" denotes the root directory of network server 104. A plurality of subdirectories, such as, "bin/", "etc/", "lib/", "usr/", "home/", are present in the lower level of the root directory "/". Since network server 104 can include a plurality of virtual hosts, each virtual host has a directory structure in directory tree 202.

For example, directory tree 202 includes a directory tree 204 rooted at a directory "VH112/" under directory "/home/" (i.e., directory "home/" under directory "/") for virtual host 112. Directory "VH112/" can be referred to as the home directory for virtual host 112. Directory tree 204 can further include a plurality of subdirectories, such as "etc/", "dev/", "lib/", "htdocs/" under directory "VH112/". Directory tree 204 can be automatically created by network server 104 upon identifying virtual host 112. Directory tree 204 can also be created by network server 104 based on configurations from a network administrator. Directory "/home/" can include the directory tree associated with other virtual hosts as well. In some embodiments, network server 104 determines the directory tree corresponding to a virtual host by determining the home directory of the virtual host. For example, network server 104 can determine directory tree 204 for virtual host 112 by determining directory "VH112/" under directory "/home/".

Figure 2B:
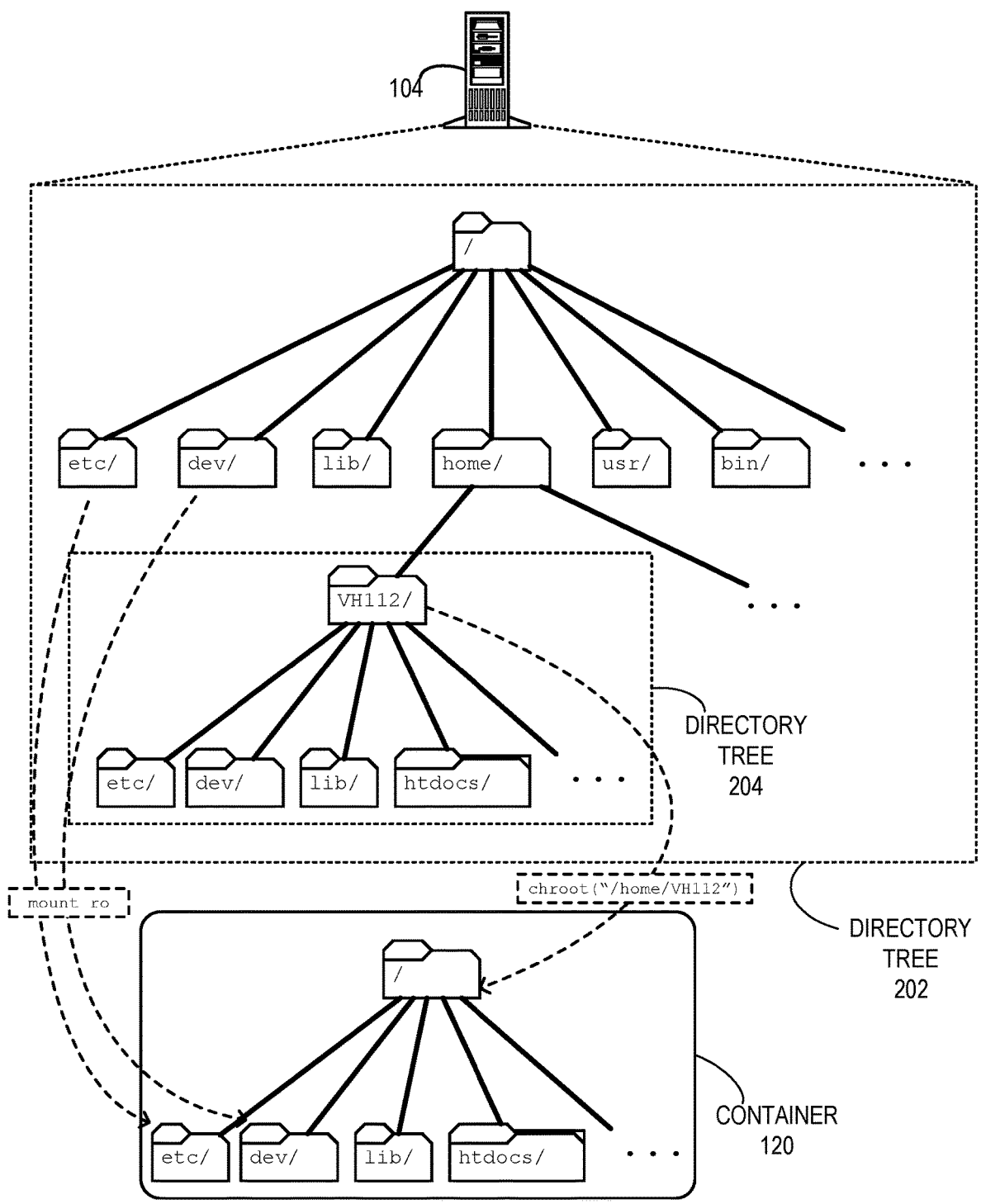
FIG. 2B illustrates an exemplary directory tree of a container of an isolated virtual host, in accordance with an embodiment of the present application.

FIG. 2B illustrates an exemplary directory tree of a container of an isolated virtual host, in accordance with an embodiment of the present application. Upon determining directory tree 204 for virtual host 112, network server 104 determines the root directory of directory tree 204 as the root directory for virtual host 112. For example, network server 104 determines directory "VH112/" as the root directory for virtual host 112. In some embodiments, network server 104 can set directory "VH112/" as the root directory for virtual host 112 based on a root directory modification function. For example, under the Linux operating system, the root directory modification function may be a "chroot" system function call (e.g., "chroot ('target root directory')"). For virtual host 112, the target root directory is "/home/VH112".

When network server 104 sets the root directory for virtual host 112, files outside of directory tree 204 may not "view" the content under directory tree 204. Since network server 104 has a plurality of virtual hosts, network server 104 allocates a dedicated "root directory" for each virtual host, thereby creating a container for that virtual host. For example, setting the root directory to be "/home/VH112/" creates container 120 of virtual host 112. Container 120 is isolated from other virtual hosts. Directories under "/VH112/", which includes "etc/", "dev/", "lib/", "htdocs/", can be divided into two categories.

One category includes the directories without dependencies on directories out of directory tree 204. Such directories pertain exclusively to virtual host 112. The other category includes the directories with dependencies on other directories not included in directory tree 204. Virtual host 112 accesses the common resources of network server 112 shared among the virtual hosts from these directories. Hence, the directories of the second category can be referred to as common resource utilization directories. Network server 104 establishes a mapping relationship between the common resource utilization directories and the corresponding system directories providing the common resources. In some embodiments, the mapping relationship is established based on a "mount" command. The mount command can be a "read only mount" command, ensuring security of host virtual host 112.

Figure 2C:
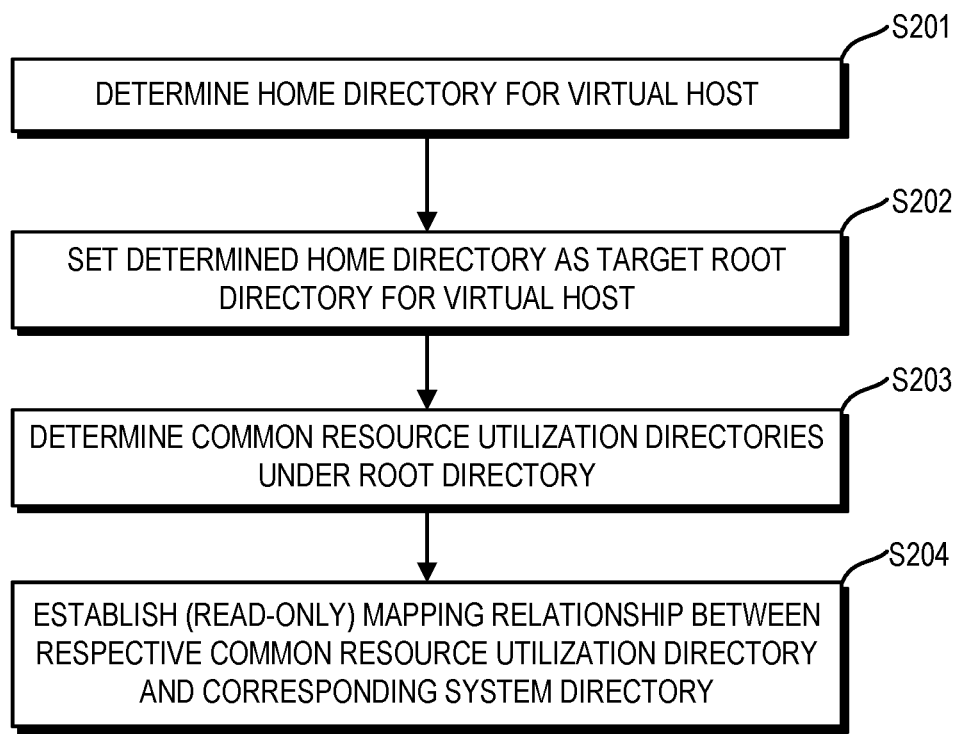
FIG. 2C presents a flowchart illustrating the process of a network server creating a container for isolating a virtual host, in accordance with an embodiment of the present application.

FIG. 2C presents a flowchart illustrating the process of a network server creating a container for isolating a virtual host, in accordance with an embodiment of the present application. During operation, the network server determines a home directory for a virtual host (operation S201) and sets the determined home directory as the target root directory for the virtual host (operation S202) (e.g., based on a "chroot" command). The network server determines the common resource utilization directories under the root directory (operation S203) and establishes a mapping relationship between a respective common resource utilization directory and a corresponding system directory (operation S204).

Figure 3:
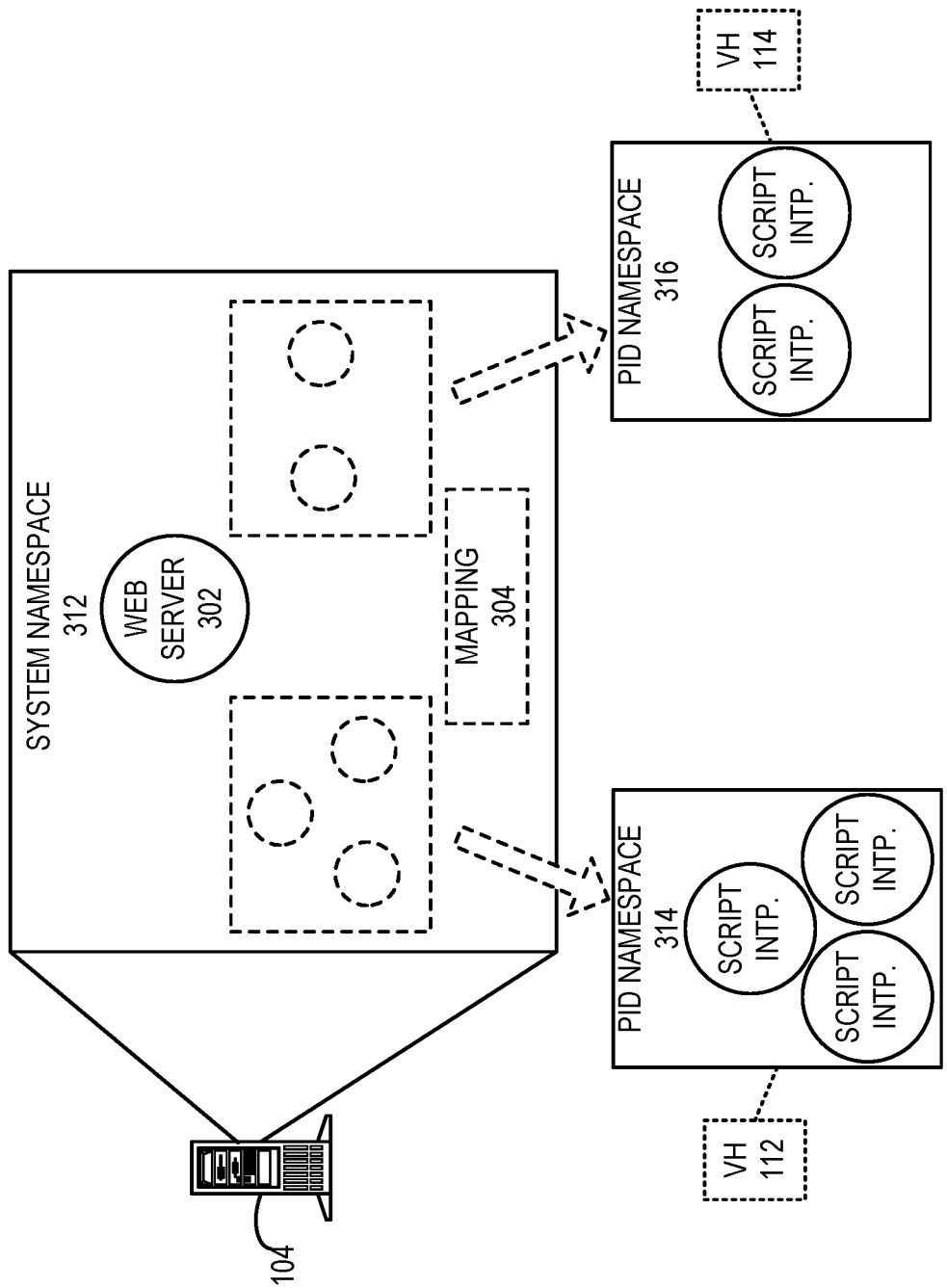
FIG. 3 illustrates an exemplary process identifier (PID) namespace for facilitating isolation among virtual hosts, in accordance with an embodiment of the present application.

In the example in FIG. 2B, by setting the root directory and mapping the common resource utilization directories for virtual host 112, network server 104 creates container 120. In the same way, network server 104 allocates different virtual hosts to different containers, thereby isolating different virtual hosts. However, network server 104 can further isolate a virtual host by isolating the processes and resources of the virtual host based on PID namespaces. FIG. 3 illustrates an exemplary PID namespace for facilitating isolation among virtual hosts, in accordance with an embodiment of the present application. In this example, network server 104 generates PIDs from a system namespace 312.

In some embodiments, network server 104 can be configured with a uniform PID namespace for the processes running in a container of a respective virtual host. A process in the container can be retrieved based on the PID allocated from the PID namespace of that virtual host. For example, network server 104 can be configured with PID namespaces 314 and 316 for the containers of virtual hosts 112 and 114, respectively. In this way, PID namespaces 314 and 316 may form a PID namespace tree, wherein PID namespaces 314 and 316 are in the same level in the PID namespace tree. The identifiers of the processes in the containers of virtual hosts 112 and 114 may be located in PID namespaces 314 and 316.

In some embodiments, network server 104 maintains a mapping 304 between a virtual host and its PID namespace (e.g., virtual host 112 and PID namespace 314) in namespace 312. A process in the container of virtual host 112 (i.e., container 120) can be retrieved based on the PID from PID namespace 314. Since PID namespaces 314 and 316 are different from each other, the processes running in the containers of virtual hosts 112 and 114 can be isolated from each other. In this way, network server 104 prevents a malicious virtual host from terminating or commissioning a process of another virtual host.

In some embodiments, network server 104 maintains a web server 302 in system namespace 312, which is the PID namespace of all virtual hosts. As a result, web server 302 can access the processes of a respective virtual host, thereby avoiding an impact on the functionality of web server 302. When network server 104 receives a web request for a dynamic resource (i.e., obtained from a script), network server 104 determines which virtual host the web request should be forwarded to. Network server 104 then identifies the PID namespace associated with that virtual host from mapping 304 and spawns a script interpreter process with an identifier in that PID namespace. For example, upon receiving a web request for a dynamic resource, network server 104 determines that virtual host 112 should process the request. Network server 104 then identifies PID namespace 314 associated with virtual host 112 from mapping 304 and spawns a script interpreter process with an identifier in PID namespace 314.

In some embodiments, network server 104 creates a new process by cloning an existing process and reselecting a program which the new process is configured to run. The older process can be referred to as the parent process and the new process can be referred to as the child process. During the cloning process, the child process typically inherits the attributes of the parent process, such as the root directory and the PID namespace. A dedicated process is assigned for each virtual host to manage the processes of the virtual host. This process can be referred to as a container process manager (CPM).

Figure 4A:
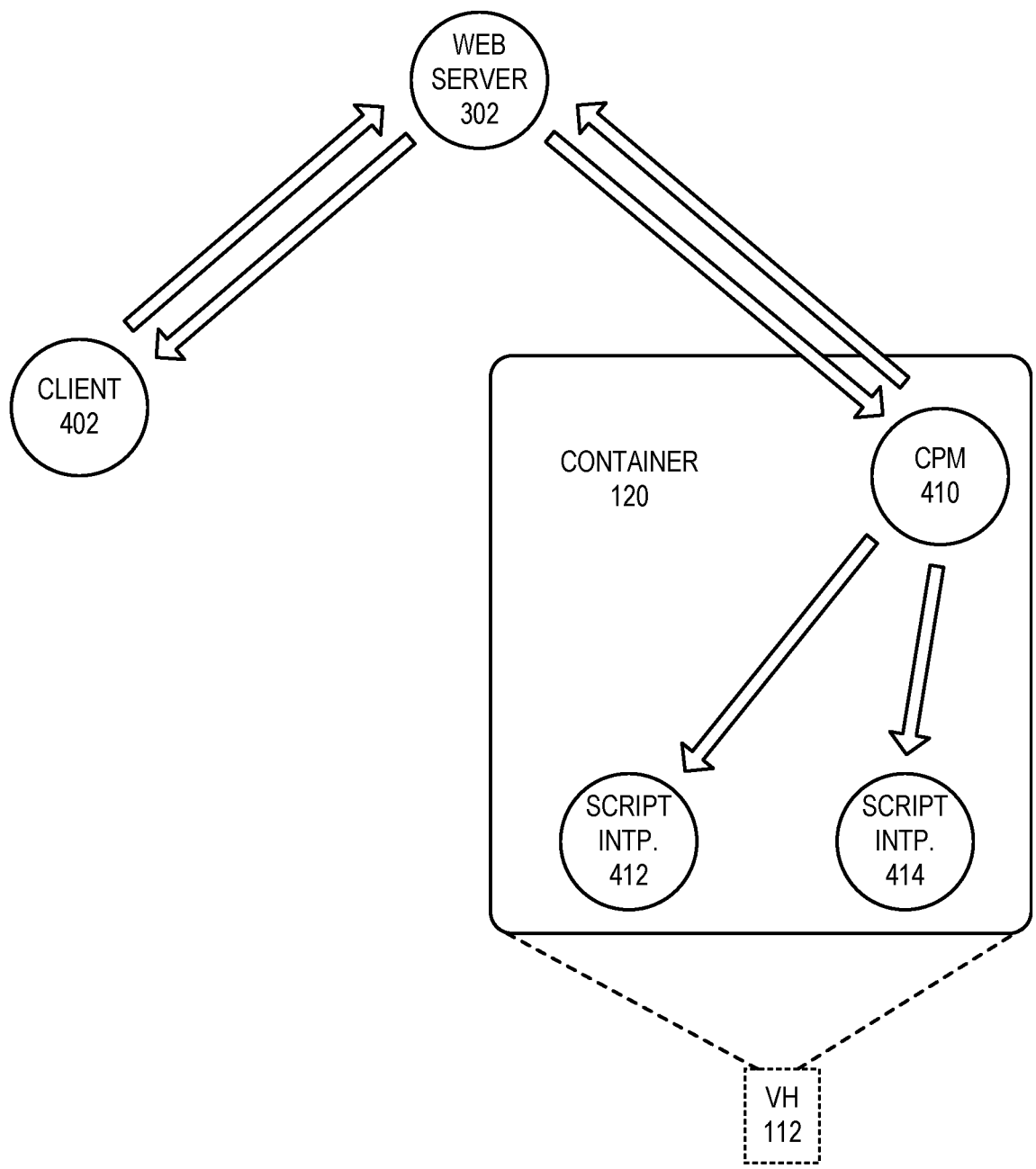
FIG. 4A illustrates an exemplary container process manager (CPM) running on an isolated virtual host, in accordance with an embodiment of the present application.

FIG. 4A illustrates an exemplary CPM running on an isolated virtual host, in accordance with an embodiment of the present application. In this example, a CPM 410 is created for virtual host 112. When CPM 410 is created, a corresponding PID namespace is assigned. For example, network server 104 assigns the PID namespace of virtual host 112 (e.g., PID namespace 314 in FIG. 3) to CPM 410. During initiation, CPM 410 can set the root directory for virtual host 112, as described in conjunction with FIG. 2B. In some embodiments, CPM 410 constantly resides in the memory of network server 104. Even if container 120 has no other process, CPM 410 continues to run. All processes in container 120 can be spawned from CPM 410 (e.g., based on a "fork" system call). Furthermore, CPM 410 is responsible for managing its child processes. In this way, all the processes running in container 120 remain in container 120 and have respective process identifiers in the PID namespace of virtual host 112.

During operation, upon receiving a web request from a client 402, web server 302 forwards the request to CPM 410 of virtual host 112, thereby delegating the responsibility of creating a script interpreter process to CPM 410. CPM 410 creates a script interpreter process 412 in container 120. Script interpreter process 412 runs the script associated with the web request and returns the content output generated by the script to web server 302. Web server 302 then returns a web response (e.g., an HTTP response) comprising the content output. In the same way, for another web request from client 402, CPM 410 creates a script interpreter process 414, which runs a script associated with the other web request to generate a content output. Web server 302 then returns a web response comprising the content output.

Figure 4B:
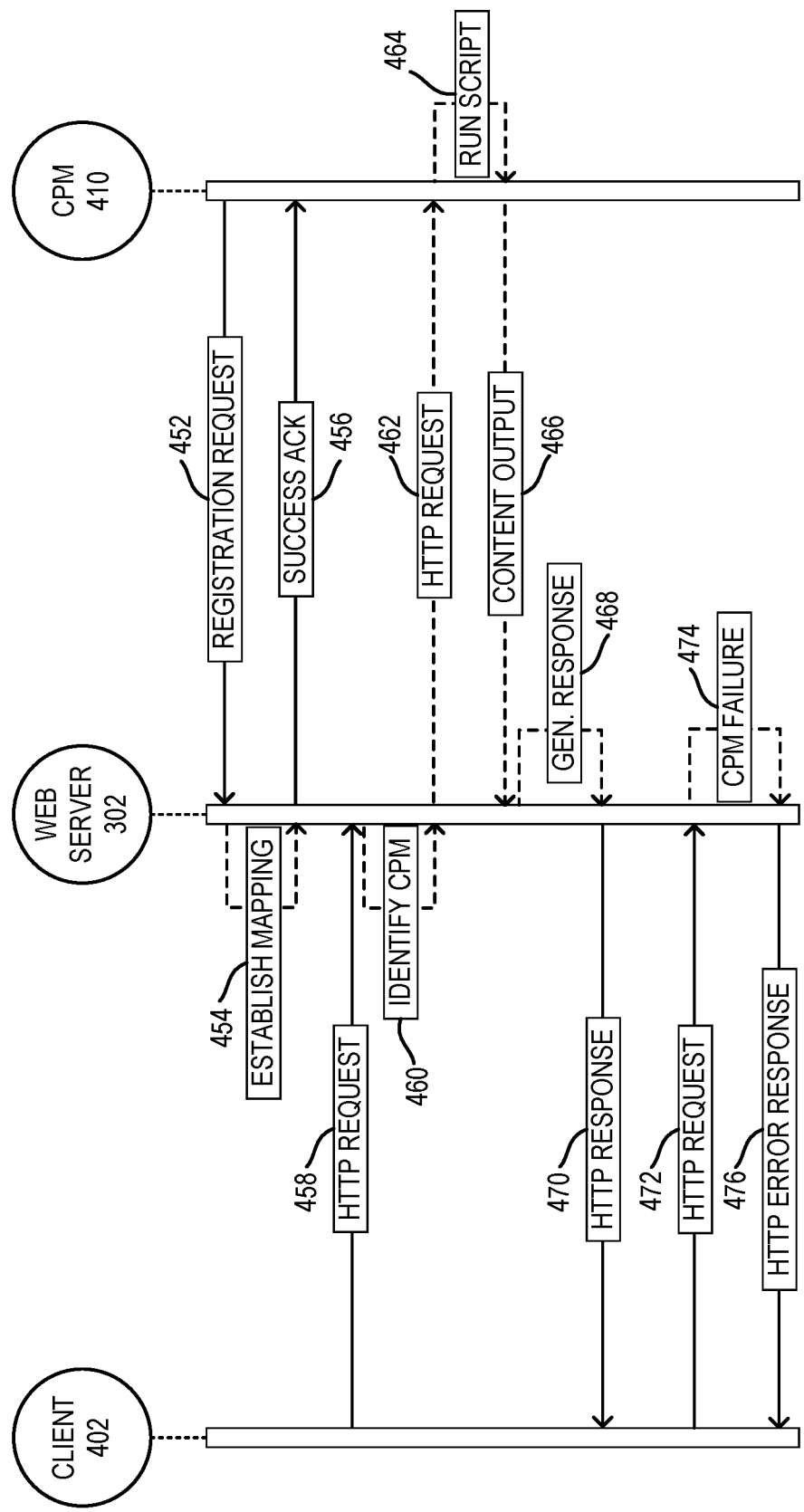
FIG. 4B illustrates an exemplary communication protocol for a CPM running on an isolated virtual host, in accordance with an embodiment of the present application.

Since web server 302 relies on CPM 410 to manage a respective script interpreter process, a protocol can be established for communication between CPM 410 and web server 302. FIG. 4B illustrates an exemplary communication protocol for a CPM running on an isolated virtual host, in accordance with an embodiment of the present application. In this example, web server 302 is initiated prior to the initiation of CPM 410. Upon initiation, web server 302 can wait for a CPM of a respective virtual host (e.g., can listen on a socket). Upon initiation, CPM 410 sends a registration request to web server 302 (operation 452). The request can carry the process identifier of CPM 410 and an identifier of virtual host 112. In some embodiments, the identifier of virtual host 112 is a user identifier of the user of virtual host 112 (e.g., the user of the domain or Internet Protocol (IP) addresses represented by virtual host 112).

Upon receiving the registration request, web server 302 establishes a mapping between the identifier of virtual host 112 and the process identifier of CPM 410 (operation 454) and returns an acknowledgment message indicating a successful registration of CPM 410 (operation 456). Upon receiving the acknowledgment message, CPM 410 waits for an HTTP request from web server 302. After receiving an HTTP request from client 402 (operation 458), web server 302 determines that the HTTP request is for virtual host 112 (e.g., based on the requested domain) and identifies CPM 410 based on the mapping (operation 460). Web server 302 issues an HTTP request to CPM 410 (operation 462). Upon receiving the HTTP request, CPM 410 creates a script interpreter process and runs the script (operation 464) and returns the content output to web server 302 (operation 466).

Upon receiving the content output, web server 302 generates an HTTP response comprising the content output (operation 468) and sends the HTTP response to client 402 (operation 470). In some embodiments, if web server 302 does not find a CPM corresponding to an HTTP request, web server 302 can return a client error message to a client. Suppose that web server 302 receives another HTTP request from client 402 (operation 472) and determines a CPM failure (operation 474). Determining a CPM failure includes determining that the HTTP request is not associated with a virtual host or a corresponding virtual host is not associated with a CPM. Web server 302 then issues an HTTP error response to client 402 (operation 476).

Figure 5A:
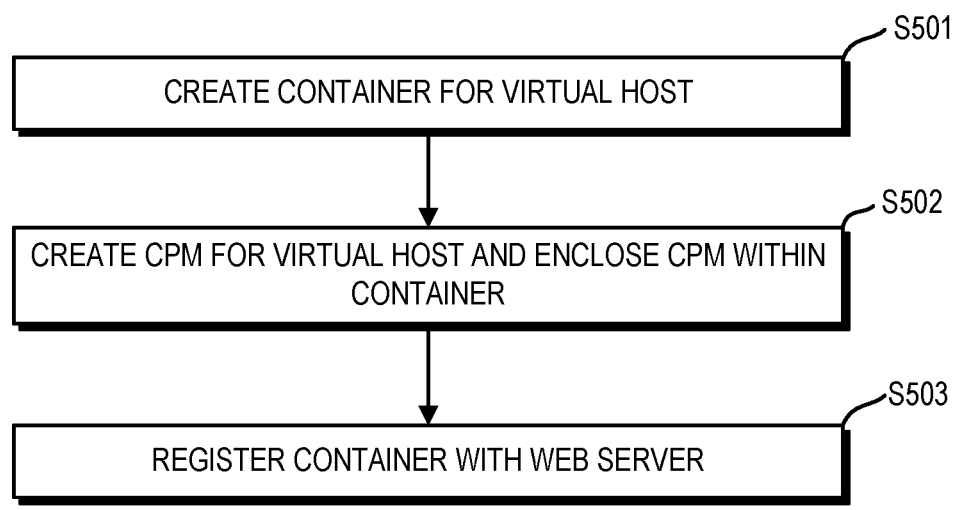
FIG. 5A presents a flowchart illustrating the process of a network server generating a CPM for isolating a virtual host, in accordance with an embodiment of the present application.

FIG. 5A presents a flowchart illustrating the process of a network server generating a CPM for isolating a virtual host, in accordance with an embodiment of the present application. During operation, the network server creates a container for a virtual host (operation S501). The network server creates a CPM for the virtual host and encloses the CPM within the container (operation S502). The network server then registers the container with a web server (operation S503).

Figure 5B:
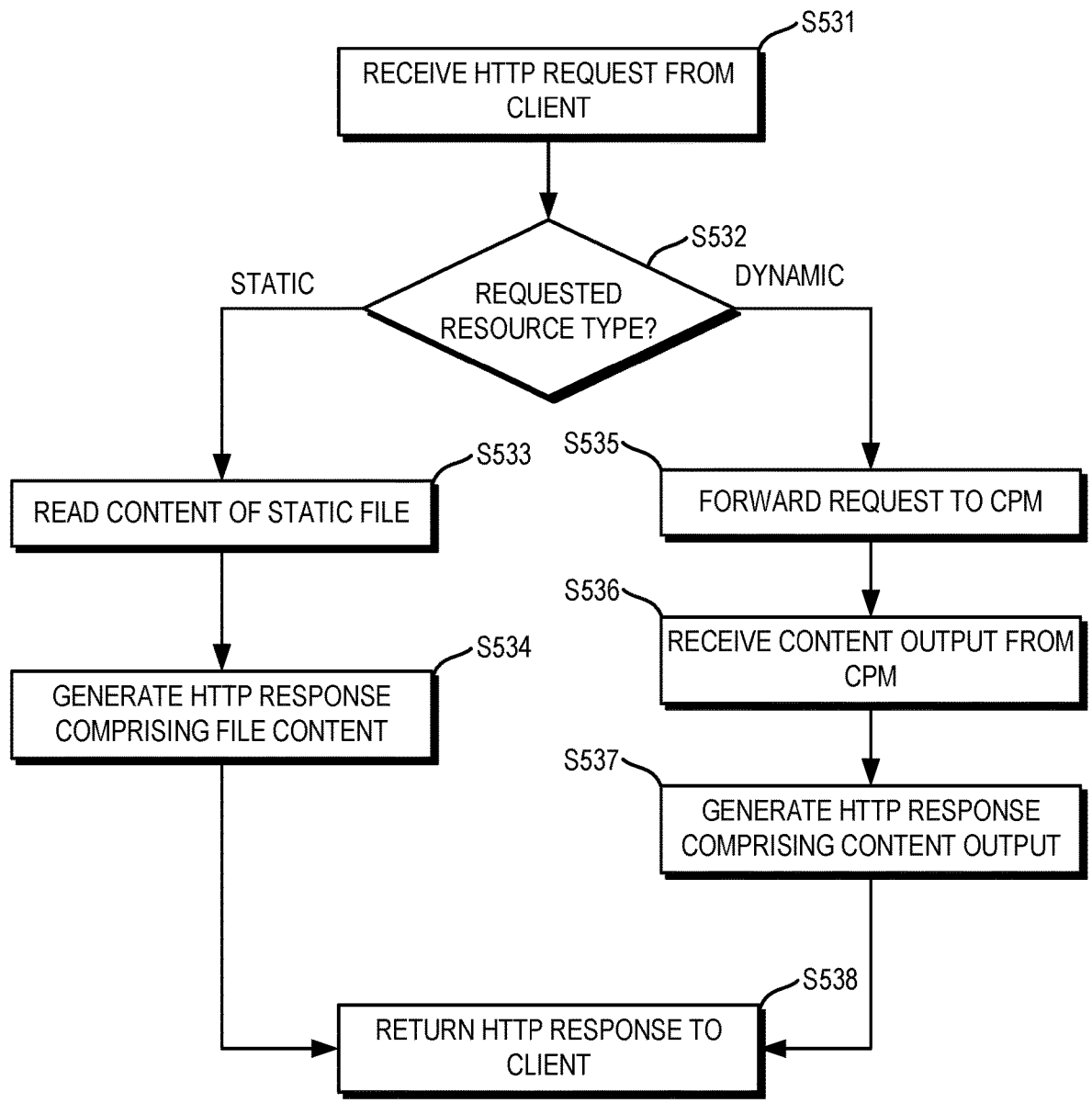
FIG. 5B presents a flowchart illustrating the process of a web server responding to a web request, in accordance with an embodiment of the present application.

FIG. 5B presents a flowchart illustrating the process of a web server responding to a web request, in accordance with an embodiment of the present application. During operation, the web server receives an HTTP request from a client (operation S531) and checks the requested resource type (operation S532). If the requested resource type is static, the web server reads the content of a static file associated with the resource (operation S533) and generates an HTTP response comprising the file content (operation S534). If the requested resource type is dynamic, the web server forwards the request to a CPM (operation S535), receives content output from the CPM (operation S536), and generates an HTTP response comprising the content output (operation S537). The web server then sends the HTTP response to the client (operation S538).

Figure 5C:
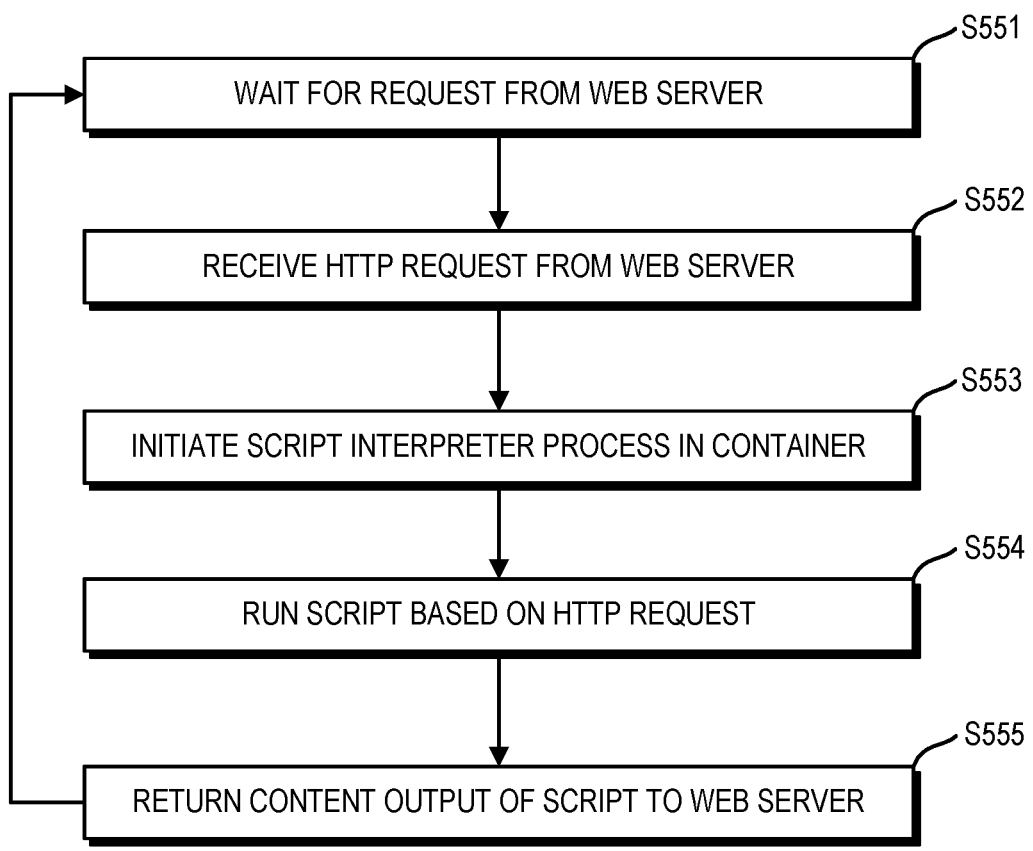
FIG. 5C presents a flowchart illustrating the process of a CPM providing content output to a web server for a web request, in accordance with an embodiment of the present application.

FIG. 5C presents a flowchart illustrating the process of a CPM providing content output to a web server for a web request, in accordance with an embodiment of the present application. During operation, the CPM waits for a request from a web server (operation S551). Upon receiving an HTTP request from the web server (operation S552), the CPM initiates a script interpreter process in the container in which the CPM is running (operation S553). For example, if the HTTP request needs processing of a Perl script, the CPM initiates a Perl script interpreter process in the container. The CPM runs the script based on the HTTP request (operation S554) and returns the content output of the script to the web server (operation S555). The CPM then continues to wait for another request from the web server (operation S551).

Exemplary Apparatus

Figure 6:
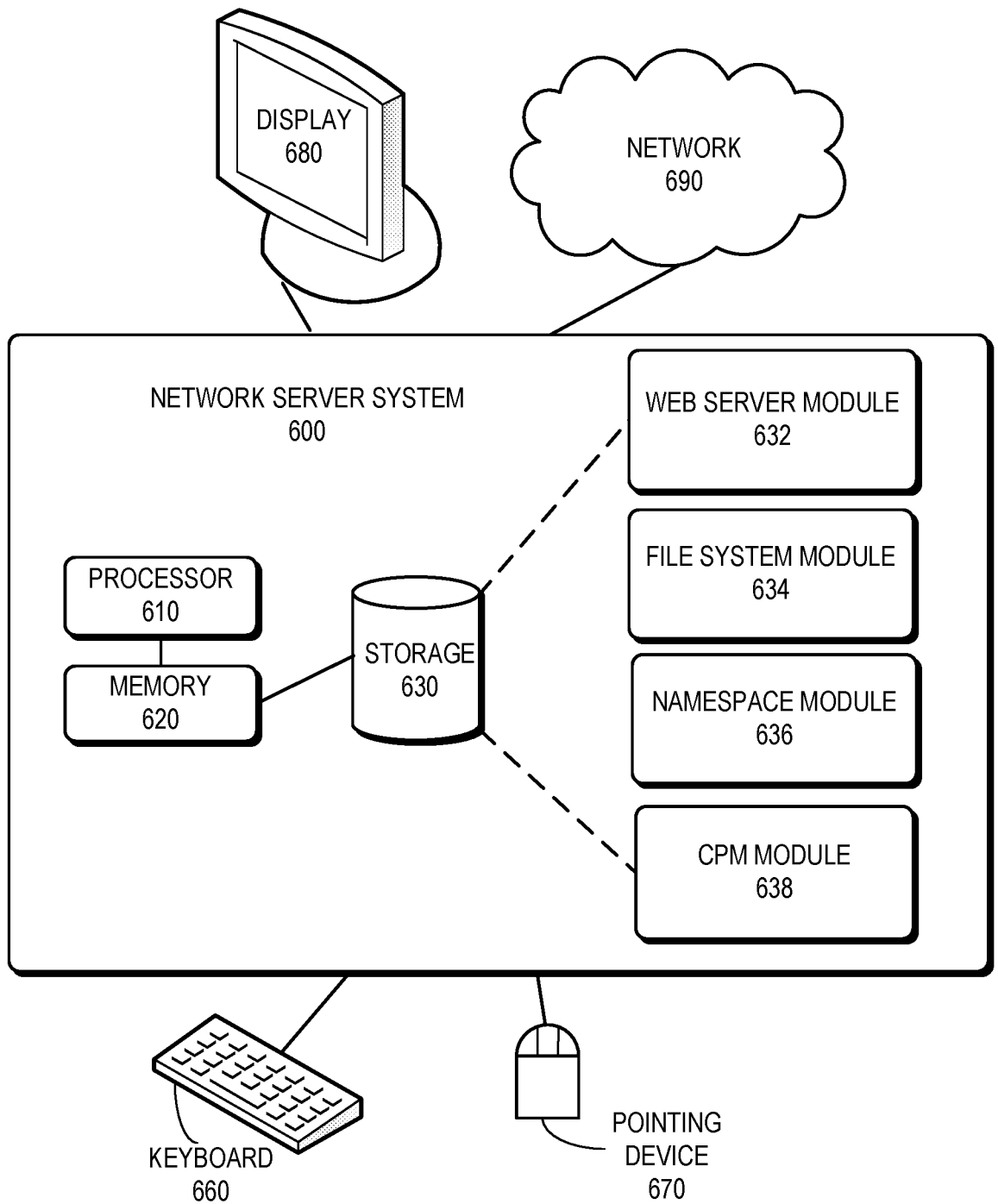
FIG. 6 presents an exemplary network server system, in accordance with an embodiment of the present application.

FIG. 6 presents an exemplary network server system, in accordance with an embodiment of the present application. A network server system 600 can facilitate isolation among virtual hosts. Network server system 600 includes a processor 610, a memory 620, and a storage device 630. Storage device 630 typically stores instructions that can be loaded into memory 620 and executed by processor 610 to perform the methods described above. In one embodiment, the instructions in storage device 630 can implement a web server module 632, a file system module 634, a namespace module 636, and a CPM module 638, all of which can communication with each other through various means.

In some embodiments, modules 632, 634, 636, and 638 can be partially or entirely implemented in hardware and can be part of processor 610. Further, in some embodiments, network server system 600 may not include a separate processor and memory. Instead, in addition to performing their specific tasks, modules 632, 634, 636, and 638, either separately or in concert, may be part of special-purpose computation engines.

Storage device 630 stores programs to be executed by processor 610. Specifically, storage device 630 stores a program that implements a web server. During operation, the application program can be loaded from storage device 630 into memory 620 and executed by processor 610. As a result, network server system 600 can perform the functions described above. Network server system 600 can be further coupled to an optional display 680, a keyboard 660, and a pointing device 670, and can be coupled via one or more network interfaces to a network 690.

During operation, web server module 632 runs a web server (e.g., a server application) with multiple domains and/or multiple IP address ranges. Each of the domains or each of the IP addresses can be represented by a virtual host. A file system module 634 creates a directory tree for a respective virtual host and sets the home directory of the directory tree as the root directory for the virtual host, thereby creating a container for the virtual host. Namespace module 636 creates a PID namespace for the processing running in the container for the virtual host. Web server module 632 creates a CPM for a respective virtual host. CPM module 638 operates a respective CPM in the container of the associated virtual host. CPM module 638 spawns a child process of itself, which is reselected to operate as a script interpreter for an HTTP request received from web server module 632.

Embodiments of the present invention may be implemented on various universal or dedicated computer system environments or configurations. For example, such computer systems may include personal computers, server computers, handheld or portable devices, tablet-type devices, multiprocessor systems, microprocessor-based systems, set-top boxes, programmable electronic consumption devices, network PCs, minicomputers, mainframe computers, distributed computing environments including any of the above systems or devices, and the like.

Embodiments of the present invention may be described within the general context of computer-executable instructions executed by a computer, such as a program module. Generally, the program module includes a routine, a program, an object, an assembly, a data structure and the like for implementing particular tasks or achieving particular abstract data types. Embodiments of the present invention may also be implemented in distributed computing environments, in which tasks are performed by remote processing devices connected via a communication network. In the distributed computing environments, program modules may be located in local and remote computer storage media that may include a storage device.

The data structures and computer instructions described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The above description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

What is claimed is:

1. A computer-implemented method for isolating virtual hosts on a computing system, comprising:
   creating, by the computing system, a container for a virtual host of a web server running on the computing system by creating a directory tree for the virtual host and setting a home directory of the directory tree as a root directory for the virtual host;
   operating a container process manager on the virtual host in the container;
   in response to receiving a web request for a dynamic web resource from a client by the container process manager on the virtual host,
   spawning a child process from the container process manager and restricting the child process within the container and a process identifier (PID) namespace for the virtual host of the web server;
   running the child process for generating the dynamic web resource in the container; and
   sending, by the container process manager, a response message comprising the dynamic web resource to the client.

2. The method of claim 1,
   wherein the directory tree includes one or more common resource utilization directories.

3. The method of claim 1, wherein a respective process identifier of the virtual host is generated from the PID namespace.

4. The method of claim 1, further comprising maintaining a mapping between a virtual host identifier of the virtual host and the PID namespace.

5. The method of claim 1, wherein the container process manager is further configured to:
   run in the container of the virtual host; and
   manage processes of the virtual host.

6. The method of claim 1, wherein the container process manager is a parent process within the container of the virtual host, and wherein the child process is a script interpreter process capable of operating with the web server.

7. The method of claim 1, further comprising, in response to detecting a failure of the container process manager for a second web request from the client, sending an error message to the client.

8. The method of claim 1, further comprising sending a request from the container process manager to the web server, wherein the request comprises a process identifier from the PID namespace and a virtual host identifier of the virtual host, and wherein the request indicates a request for registering the container with the web server.

9. A non-transitory computer-readable storage medium storing instructions that when executed by a computer cause the computer to perform a method for isolating virtual hosts on a computing system, the method comprising:
   creating, by the computing system, a container for a virtual host of a web server running on the computing system by creating a directory tree for the virtual host and setting a home directory of the directory tree as a root directory for the virtual host;
   operating a container process manager on the virtual host in the container;
   in response to receiving a web request for a dynamic web resource from a client by the container process manager on the virtual host,
   spawning a child process from the container process manager and restricting the child process within the container and a process identifier (PID) namespace for the virtual host of the web server;
   running the child process for generating the dynamic web resource in the container; and
   sending, by the container process manager, a response message comprising the dynamic web resource to the client.

10. The non-transitory computer-readable storage medium of claim 9 wherein the directory tree includes one or more common resource utilization directories.

11. The non-transitory computer-readable storage medium of claim 9, wherein a respective process identifier of the virtual host is generated from the PID namespace.

12. The non-transitory computer-readable storage medium of claim 9, wherein the method further comprises maintaining a mapping between a virtual host identifier of the virtual host and the PID namespace.

13. The non-transitory computer-readable storage medium of claim 9, wherein the container process manager is further configured to:
   run in the container of the virtual host; and
   manage processes of the virtual host.

14. The non-transitory computer-readable storage medium of claim 9, wherein the container process manager is a parent process within the container of the virtual host, and wherein the child process is a script interpreter process capable of operating with the web server.

15. The non-transitory computer-readable storage medium of claim 9, wherein the method further comprises, in response to detecting a failure of the container process manager for a second web request from the client, sending an error message to the client.

16. The non-transitory computer-readable storage medium of claim 9, wherein the method further comprises sending a request from the container process manager to the web server, wherein the request comprises a process identifier from the PID namespace and a virtual host identifier of the virtual host, and wherein the request indicates a request for registering the container with the web server.

17. A computing system for facilitating dynamic load-based merging, the computing system comprising:
   a processor; and
   a memory coupled to the processor and storing instructions, which when executed by the processor cause the processor to perform a method, the method comprising:
      creating, by the computing system, a container for a virtual host of a web server running on the computing system by creating a directory tree for the virtual host and setting a home directory of the directory tree as a root directory for the virtual host;
      operating a container process manager on the virtual host in the container;
      in response to receiving a web request for a dynamic web resource from a client by the container process manager on the virtual host,
      spawning a child process from the container process manager and restricting the child process within the container and a process identifier (PID) namespace for the virtual host of the web server;
      running the child process for generating the dynamic web resource in the container; and
      sending, by the container process manager, a response message comprising the dynamic web resource to the client.

18. The computing system of claim 17,
wherein the directory tree includes one or more common resource utilization directories.

19. The computing system of claim 17, wherein a respective process identifier of the virtual host is generated from the PID namespace.

20. The computing system of claim 17, wherein the method further comprises, in response to detecting a failure of the container process manager for a second web request from the client, sending an error message to the client.

* * * * *